(12) United States Patent
Ng et al.

(10) Patent No.: US 7,747,808 B2
(45) Date of Patent: Jun. 29, 2010

(54) USB HOST CONTROLLER WITH MEMORY FOR TRANSFER DESCRIPTORS

(75) Inventors: Chee Yu Ng, Singapore (SG); Yeow Khai Chang, Singapore (SG); Kawshol Sharma, Singapore (SG); Bart Vertenten, Leuven (BE)

(73) Assignee: ST-Ericsson SA, Plan-les-Ouates (CH)

( * ) Notice: Subject to any disclaimer, the term of this patent is extended or adjusted under 35 U.S.C. 154(b) by 118 days.

(21) Appl. No.: 10/556,450

(22) PCT Filed: May 12, 2004

(86) PCT No.: PCT/IB2004/050640

§ 371 (c)(1),
(2), (4) Date: Nov. 10, 2005

(87) PCT Pub. No.: WO2004/102406

PCT Pub. Date: Nov. 25, 2004

(65) Prior Publication Data

US 2007/0011386 A1  Jan. 11, 2007

(51) Int. Cl.
G06F 13/20 (2006.01)
G06F 13/36 (2006.01)
G06F 13/14 (2006.01)
G06F 13/40 (2006.01)
G06F 13/42 (2006.01)

(52) U.S. Cl. .................... 710/313; 710/315
(58) Field of Classification Search ................ 710/305
See application file for complete search history.

(56) References Cited

U.S. PATENT DOCUMENTS

| | | | |
|---|---|---|---|
| 5,974,486 A * | 10/1999 | Siddappa | 710/53 |
| 6,119,190 A | 9/2000 | Garney | |
| 6,470,409 B1 | 10/2002 | Ridgeway | |
| 6,496,869 B1 | 12/2002 | Cheng | |
| 6,742,076 B2 * | 5/2004 | Wang et al. | 710/314 |
| 6,748,466 B2 * | 6/2004 | Leete | 710/52 |
| 7,003,613 B1 * | 2/2006 | Wang et al. | 710/305 |
| 7,007,119 B2 * | 2/2006 | Howard et al. | 710/100 |
| 7,028,109 B2 * | 4/2006 | Saito et al. | 710/33 |

(Continued)

FOREIGN PATENT DOCUMENTS

EP 0530363 A1 3/1993

(Continued)

OTHER PUBLICATIONS

Intel Corporation; "Universal Host Controller Interface (UHCI) Design Guide"; Intel Corporation; Revision 1.1; Mar. 1996; all pages.*

(Continued)

*Primary Examiner*—Ryan M Stiglic
(74) *Attorney, Agent, or Firm*—Thomas J. Satagaj; Seed IP Law Group PLLC

(57) ABSTRACT

An electronic device, operating as a USB host, has an embedded processor and a system memory, connected by a memory bus. A host controller integrated circuit does not need to master the system memory, but instead acts purely as a slave. The embedded processor is then adapted to write the data to the host controller integrated circuit in the form of transfer-based transactions.

21 Claims, 11 Drawing Sheets

U.S. PATENT DOCUMENTS

| | | |
|---|---|---|
| 7,028,111 B2 | 4/2006 | Chang et al. |
| 7,035,948 B1 * | 4/2006 | Liang et al. .................... 710/56 |
| 7,058,747 B2 | 6/2006 | Chang et al. |
| 7,093,118 B2 * | 8/2006 | Nalawadi et al. ................ 713/2 |
| 7,281,074 B2 * | 10/2007 | Diefenbaugh et al. ....... 710/260 |
| 7,340,554 B2 * | 3/2008 | Lee et al. .................... 710/313 |
| 2002/0116565 A1 * | 8/2002 | Wang et al. .................. 710/313 |
| 2003/0005272 A1 * | 1/2003 | Nalawadi et al. ................ 713/1 |
| 2004/0093437 A1 * | 5/2004 | Leete .......................... 710/15 |
| 2004/0111543 A1 * | 6/2004 | Leete et al. ................... 710/54 |
| 2005/0033896 A1 * | 2/2005 | Wang et al. .................. 710/314 |
| 2007/0011386 A1 * | 1/2007 | Ng et al. ..................... 710/305 |
| 2007/0028011 A1 * | 2/2007 | Lee et al. ..................... 710/22 |
| 2007/0208895 A1 * | 9/2007 | Chang et al. ................ 710/110 |
| 2007/0208896 A1 * | 9/2007 | Chang et al. ................ 710/260 |

FOREIGN PATENT DOCUMENTS

| | | |
|---|---|---|
| EP | 0632390 A1 | 1/1995 |
| JP | 8339210 A | 12/1996 |
| JP | 2005504392 T | 2/2005 |
| JP | 2005527877 T | 9/2005 |
| WO | 03029996 A1 | 4/2003 |
| WO | 03029998 A1 | 4/2003 |

OTHER PUBLICATIONS

Compaq et al.; "Open Host Controller Interface Specification for USB"; Compaq et al; Revision 1.0a; Sep. 14, 1999; all pages.*

* cited by examiner

FIG. 7a

| NAME | DESCRIPTION |
|---|---|
| Hub Address (6:0) | This field holds the device address of the transaction Translator's (TT) hub |
| Port Number (6:0) | This field is the port number of the recipient TT |
| SE(1:0) | This definition depends on the endpoint type and direction. It is only valid for split transactions. |
| L | Last: This indicates of it is the last complete-split transaction that is scheduled (only used for periodic split-transaction) |
| S | This bit indicates if a split transaction has to be executed or not.<br>0: HS transaction  1: Split transaction |
| EPType(1:0) | Transaction Type.  00b: control  01B: Isochronous  10b: Bulk  11b: interrupt. |
| Token(1:0) | Token PID for this transaction<br>00b: OUT  01b: IN  10b: SETUP  11b: PING |
| Device Address (6:0) | This is the USB address of the function containing the endpoint that this buffer refers to. |
| EndPt(3:0) | This is the USB address of the endpoint within the function. |
| Mult(1:0) | This field is a multiplier used to keep the host controller as the number of successive packets the host controller may submit to the endpoint in the current execution.<br>For periodic list, this is a copy of the MULT field in the iTD of QH.<br>For the asynchronous list, this is set to Async Schedule Park Mode Count if the Async Schedule Park Mode is enable and the endpoint speed is high-speed and the token that has to be sent is an IN or an OUT. If this is not the case then this field must be set to 01b. |

FIG. 7b

| | |
|---|---|
| Maximum Packet Length (10:0) | This field indicates the maximum number of bytes that can be sent to or received from the endpoint in a single data packet. |
| NrBytes To Transfer | This field indicates how many bytes can be transferred by this data structure. It is used to indicate the depth of the DATA field. |
| Uframe (7:0) | 8 LSB of the Uframe number. This is only uses for transactions on the periodic list.<br>Bits 2 down to 0 indicat during which uFrame the transaction must be executed.<br>Bits 7 down to 3 are used to calculate the Frame Tag field. |
| V | This indicates if the data in the current structure is valid or not. This bit needs to be handled in a different way by the usd_hs_exec_trans module if the modules are used in a EHCI slave architecture. |
| A | This bit corresponds to the active bit in the status field of the iTD, siTD or QH. |
| H | This bit corresponds to the status field of the QH. This bit is default 0 for an isochronous transaction. |
| B | This bit correspond to the Babbke Detected bit in the status field of the iTD, siTD or QH. |
| X | This bit corresponds to the Transaction Error bit in the status field of the iTD, siTD or QH. |
| SC | This bit correspond to the Split Transaction State bit in the siTD or QH. This bit is default 0 for a high-speed transaction. |
| P/E | For Split Transactions on the periodic list this bit indicates if an ERR handshake was received. For HS transactions this bit corresponds to the Ping State bit in the Status field of a QH. |

FIG. 7c(1)

| | |
|---|---|
| dt | Data Toggle. This bit corresponds to the data toggle bit in the QH. This field is default 0 for isochronous transactions. |
| Cerr (1:0) | Error Counter. This field corresponds to the Cerr field in the QH. This field is default 0 for isochronous transactions. |
| NakCnt (3:0) | Nak Counter. This field corresponds to the Nak Counter field in the QH. This is default 0 for isochronous transactions. |
| S-bytes (6:0) | This field corresponds to the S-bytes field in the QH. It keeps track of the number of bytes sent or received during an IN or OUT split transaction. |
| NrBytes Transferred (11:0) | This field indicates how many bytes are sent or received for this transaction. If Mult is greater than one, then it is possible to store intermediate results in this field. |
| BPS | Back Pointer Status. This bit is only used for siTD. If set then the status information in this word corresponds to the data structure referenced by the Back Pointer. |
| ECS | Execute CS and SS. This is used for split isochronous transactions to differentiate between case 2a and 2b. This bit can only be set of only BPS is set. This means that a split transaction has to be executed if the result of the complete transaction is that the Active bit of the Back Pointer must be cleared. |
| CSE | CS and SS executed. This bit is set of there is both CS transaction executed to the same isochronous endpoint. |
| RL | Reload field. This is a copy of the RL field in the QH. For iTD and siTD this must be set to 0h. |

FIG. 7c(2)

| | |
|---|---|
| Ex | Packet Executed. This bit may be set by Exec_Trans to indicate that there was a packet sent on the USB bus. This is only used for periodic transactions. For asynchronous transactions this bit should always be o. |
| Data Start Address (20:0) | This is the start address for the data that will be sent/received on/from the USB bus. |
| RAM structure pointer (4:0) | Pointer to the actual data structure where this header is derived from. This os an address in the RAM periodic of the RAM async. |

FIG. 7c(3)

USB HOST CONTROLLER WITH MEMORY FOR TRANSFER DESCRIPTORS

CROSS-REFERENCE TO RELATED APPLICATIONS

This application is a national stage application of Patent Cooperation Treaty (PCT) Application No. PCT/IB2004/050640 filed May 12, 2004, which in turn claims priority from PCT/SG03/00128 filed May 15, 2003, the contents of which are incorporated by reference herein.

TECHNICAL FIELD

This invention relates to a bus system, and in particular to a bus controller, and to a device incorporating the bus controller.

More particularly, the invention relates to an integrated circuit which can be used as a host controller within an electronic device, in order to improve the efficiency of operation of the device.

BACKGROUND INFORMATION

In a conventional electronic device, operating as a USB host, the processor is able to write data into a system memory. A host controller integrated circuit is then able to read the data directly from the system memory. In order to be able to do this, the host controller needs to master the system memory. However, since the system memory is shared between the host controller integrated circuit and the system processor, this requirement that the host controller be able to master the system memory requires the use of a bus master, which is specific to the system processor. Moreover, while the host controller is mastering the system memory, the core function of the device, running under the control of the system processor, may be disrupted.

BRIEF SUMMARY

According to an aspect of the present invention, a host controller integrated circuit is unable to master the system memory, but instead acts purely as a slave. The embedded processor is then adapted to write the data to the host controller integrated circuit in the form of transfer-based transactions.

BRIEF DESCRIPTION OF THE SEVERAL VIEWS OF THE DRAWINGS

The invention will be described with reference to the accompanying drawings in which:

FIG. 7 shows the structure of a transfer descriptor header, with which data is transferred.

DETAILED DESCRIPTION

Figure 1:
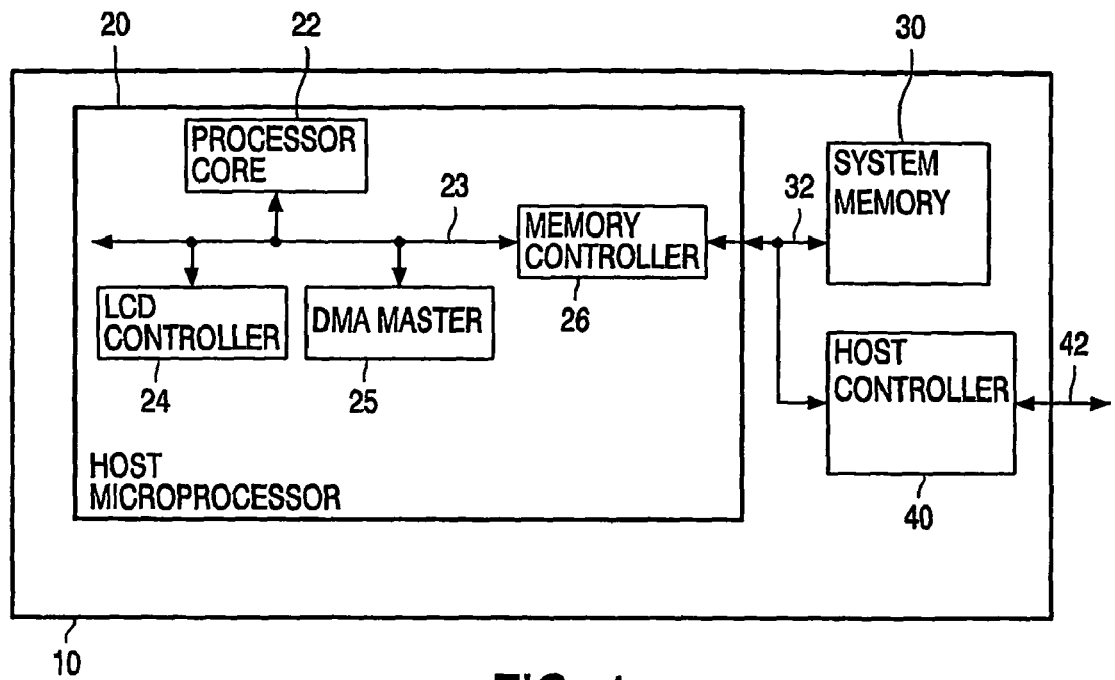
FIG. 1 is a block schematic diagram of a USB host in accordance with an aspect of the present invention.

FIG. 1 is a block schematic diagram of the relevant parts of an electronic device 10, operating as a USB host. The invention is particularly applicable to devices such as mobile phones, or PDAs, in which the functional limitations of the microprocessor and the system memory are more relevant, rather than in personal computers (PCs). However, the invention is applicable to any device which can operate as a USB host.

It will be apparent that the device 10 will have many features, which are not shown in FIG. 1, since they are not relevant to an understanding of the present invention.

The device 10 has a host microprocessor 20, which includes a processor core 22, connected by a standard system bus 23 to a LCD controller 24, a DMA master 25, and a memory controller 26. The memory controller 26 is connected to a system memory 30 by means of a peripheral bus 32.

A host controller 40 is also connected to the host microprocessor 20 and the system memory 30, by means of the peripheral bus, or memory bus, 32. The host controller 40 has an interface for a USB bus 42, through which it can be connected to multiple USB devices. In this illustrated embodiment, the host controller 40 is a USB 2.0 host controller.

As is conventional, the host controller 40 is adapted to retrieve data which is prepared by the processor 20 in a suitable format, and to transmit the data over the bus interface. In USB communications, there are two categories of data transfer, namely asynchronous transfer and periodic transfer. Control and bulk data are transmitted using asynchronous transfer, and ISO and interrupt data are transmitted using periodic transfer. A Queue Transaction Descriptor (qTD) data structure is used for asynchronous transfer, and an Isochronous Transaction Descriptor (iTD) data structure is used for periodic transfer.

The processor 20 prepares the data in the appropriate structure, and stores it in the system memory 30, and the host controller 40 must then retrieve the data from the system memory 30.

Figure 2:
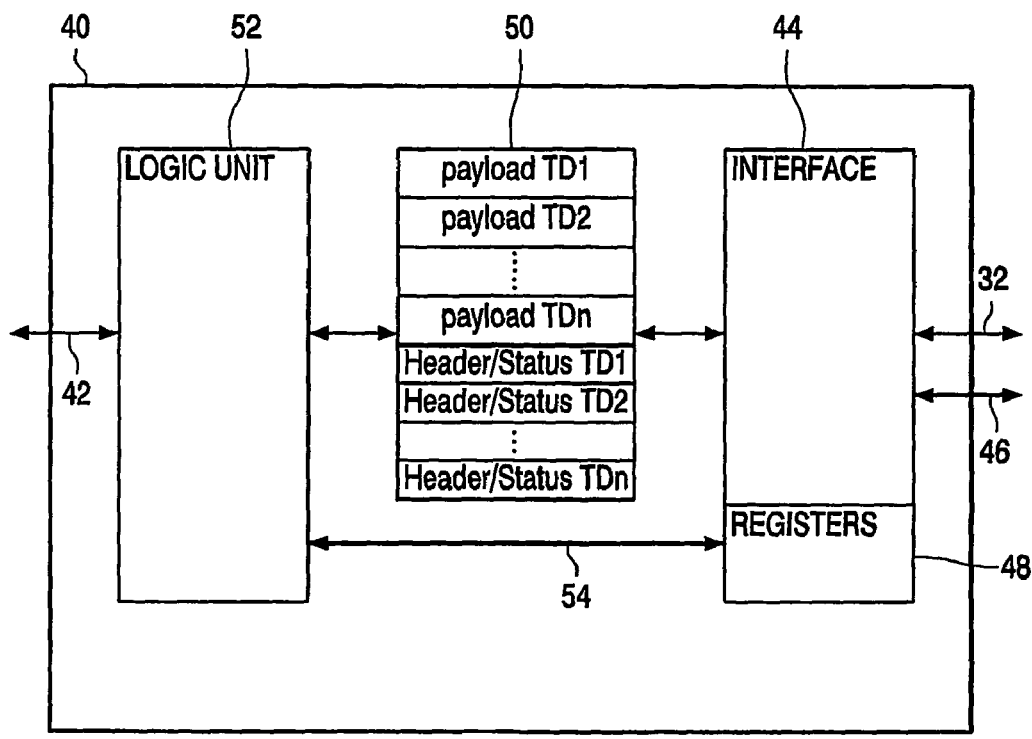
FIG. 2 is a block schematic diagram of a host controller in accordance with another aspect of the invention.

FIG. 2 shows in more detail the structure of the embedded USB host controller 40.

As mentioned above, the host controller 40 has a connection for the memory bus 32, which is connected to an interface 44, containing a Memory Mapped Input/Output, a Memory Management Unit, and a Slave DMA Controller. The interface 44 also has a connection 46 for control and interrupt signals, and registers 48 which support the RAM structure and the operational registers of the host controller 40.

The interface 44 is connected to the on-chip RAM 50 of the host controller, which in this preferred embodiment is a dual port RAM, as will be described in more detail below. The memory 50 is connected to the host controller logic unit 52, which also contains an interface for the USB bus 42. Control signals can be sent from the registers 48 to the logic unit 52 on an internal bus 54.

As mentioned above, the on-chip memory 50 in this case is a dual port RAM, allowing data to be written to and read from the memory simultaneously.

Figure 3:
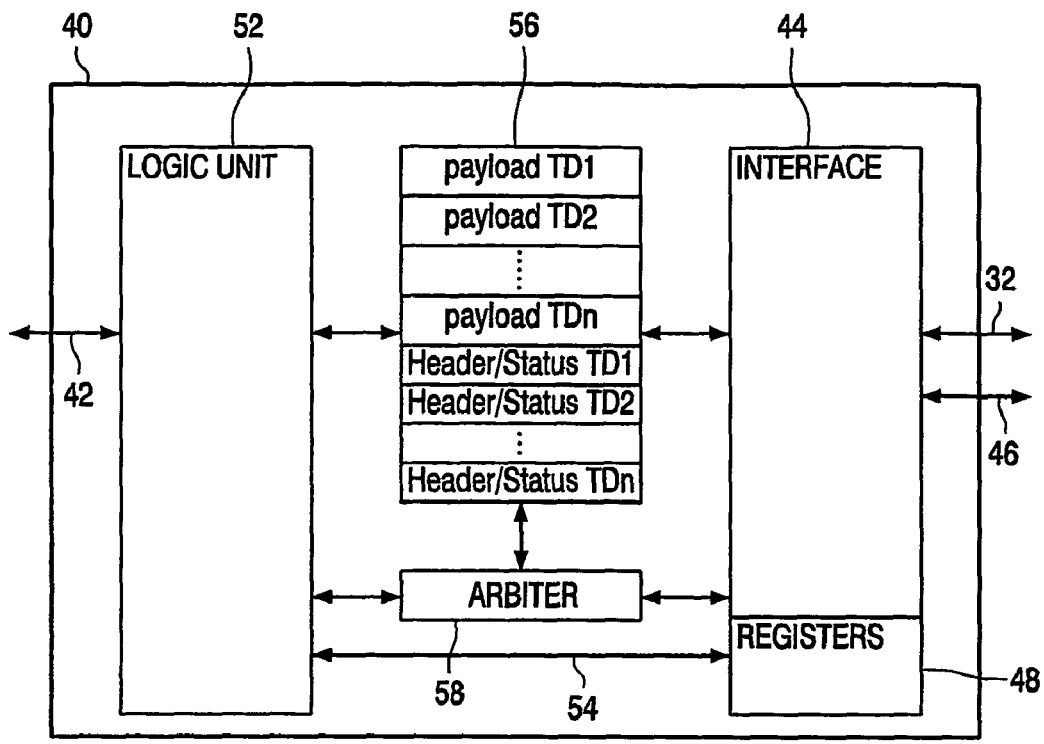
FIG. 3 is a block schematic diagram of an alternative form of host controller in accordance with an aspect of the invention.

FIG. 3 shows an alternative embodiment of the invention, in which common reference numerals indicate the same features as in FIG. 2. In this case, the on-chip memory 56 is a single port RAM, and data written to and read from the memory 56 is transferred through an arbiter 58, which again allows for effectively simultaneous access to the memory 56.

Figure 4:
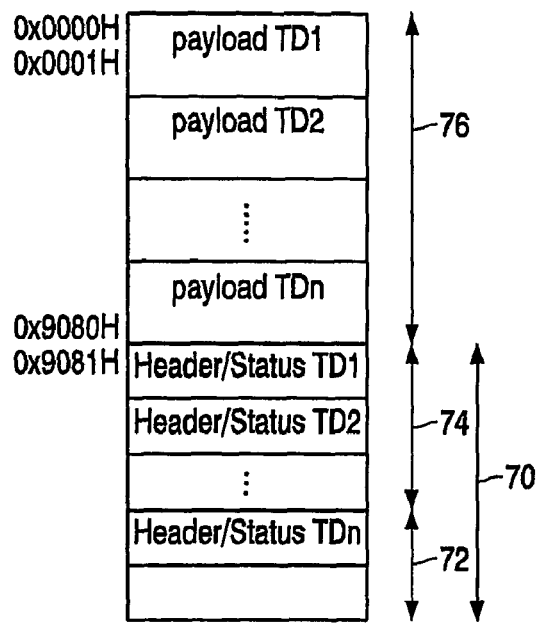
FIG. 4 illustrates the structure of the memory in the host controller of FIG. 2 or FIG. 3.

FIG. 4 shows the structure of the on-chip memory. As far as the structure shown in FIG. 4 is concerned, this is the same whether the on-chip memory is the dual port RAM 50 shown in FIG. 2, or the single port RAM 56 shown in FIG. 3.

As shown in FIG. 4, the RAM is effectively divided into two parts, namely a first part 70 which contains header and status information for the stored transfer descriptors TD1, TD2, . . . , TDn, and which is itself subdivided into a portion 72 relating to asynchronous (bulk) transfers and a portion 74 relating to periodic (isochronous and interrupt) transfers, and a second part 76, which contains the payload data for those stored transfer descriptors TD1, TD2, . . . , TDn.

This structure of the RAM has the advantage that the host microprocessor 20 an easily write and read all of the transfer descriptor headers together. This structure also makes it easy for the headers relating to periodic transfers to be scanned only once in each micro-frame, while headers relating to asynchronous transfers are scanned continuously throughout the micro-frame.

This means that the time between transactions will be small and, equally importantly, it will be consistent from one transaction to another.

Figure 5:
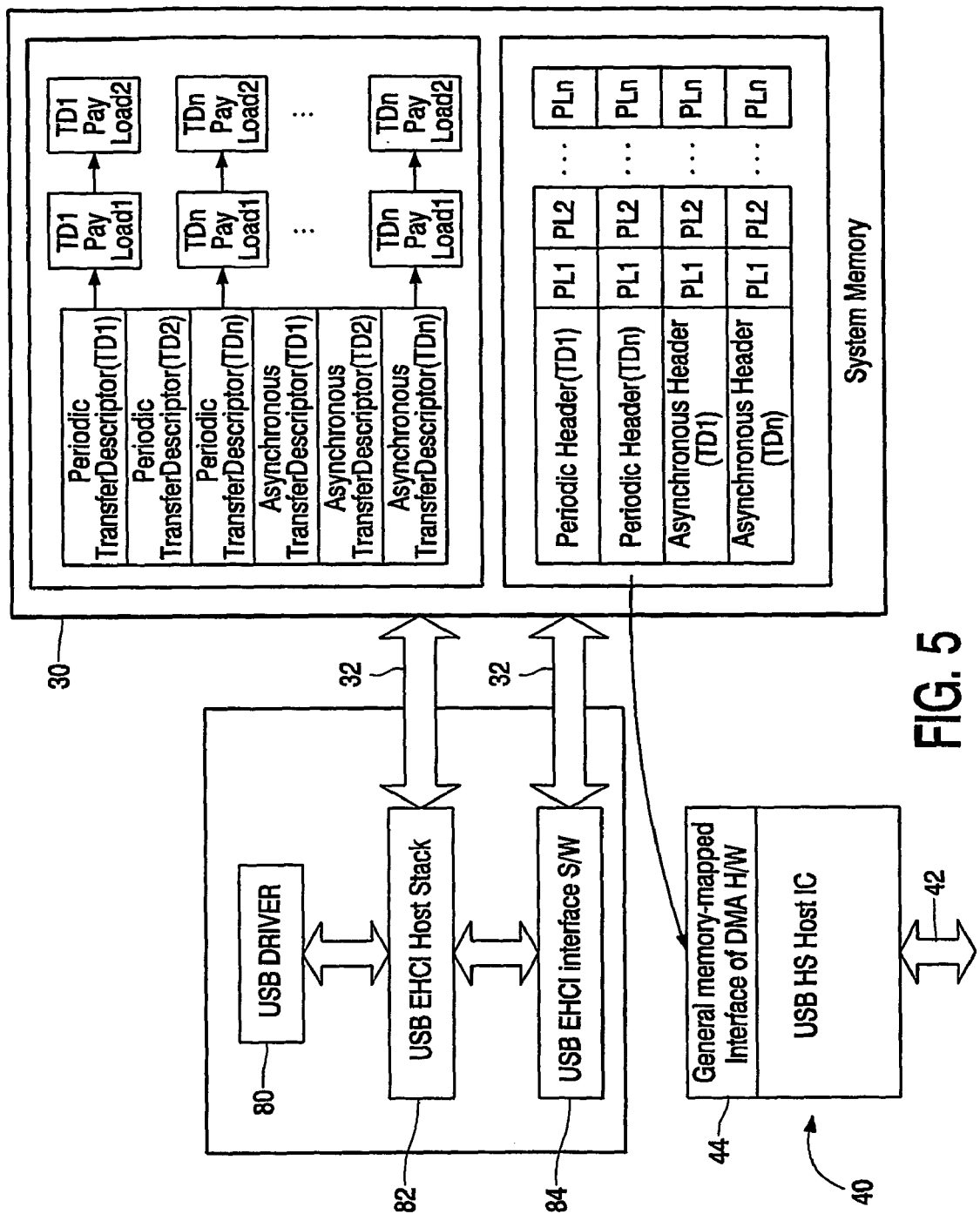
FIG. 5 is an illustration showing the format of software in the device of FIG. 1.

FIG. 5 is a schematic diagram showing in part the software operating on the host controller 40, in order to illustrate the method of operation of the device according to the invention.

The host controller 40 runs USB driver software 80 and USB Enhanced Host Controller Interface software 82, which are generally conventional.

However, in accordance with the present invention, the host controller 40 also runs USB EHCI interface software 84, which prepares a list of transfer-based transfer descriptors for every endpoint to which data is to be transmitted.

The EHCI interface software 84 is written such that it uses the parameters which are generated by the EHCI host stack 82 for the existing periodic and asynchronous headers, and can be used for all different forms of USB transfer, in particular high speed USB transfer, such as high speed isochronous, bulk, interrupt and control and start/stop split transactions.

The host microprocessor 20 writes the transfer-based transfer descriptors into the RAM 50 or 56 of the host controller 40 through the peripheral bus 32, without the host controller 40 requiring to master the bus 32. In other words, the host controller 40 acts only as a slave. The transfer-based transfer descriptors can then be memory-mapped into the RAM 50 or 56 of the host controller 40.

Advantageously, the built-in memory 50 or 56 of the host controller 40 is mapped in the host microprocessor 20, improving the ease with which transactions can be scheduled from the host microprocessor 20.

Moreover, as described above, the use of a dual-port RAM 50, or a single-port RAM 56 plus an arbiter 58, means that, while one transfer-based transfer descriptor is being executed by the host controller 40, the host microprocessor 20 can be writing data into another block space.

Figure 6:
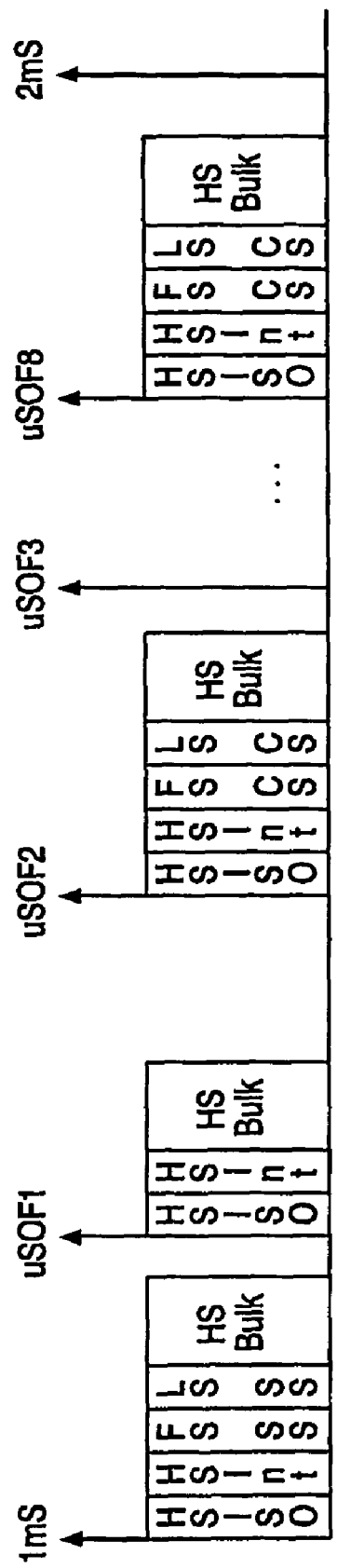
FIG. 6 illustrates the format of data written from the host microprocessor to the host controller.

FIG. 6 illustrates the format of one USB frame, divided into multiple micro-frames, in which data is transmitted from the host controller 40 over the USB bus 42. As is conventional, multiple transactions, including transactions of different transfer types, may be sent within one micro-frame. Again, as is conventional, high speed isochronous transfer is always first, followed by high speed interrupt transfer, and full speed and low speed Start Split and Complete Split transfers, with high speed bulk data occupying the remaining time in the micro-frame.

The transfer-based protocol allows the host microprocessor 20 to write a 1 ms frame of data into the RAM 50 or 56 of the host controller (provided that the RAM is large enough to hold this data), such that this can be transmitted over the USB bus 42 without further intervention from the host microprocessor 20.

Figure 7A:
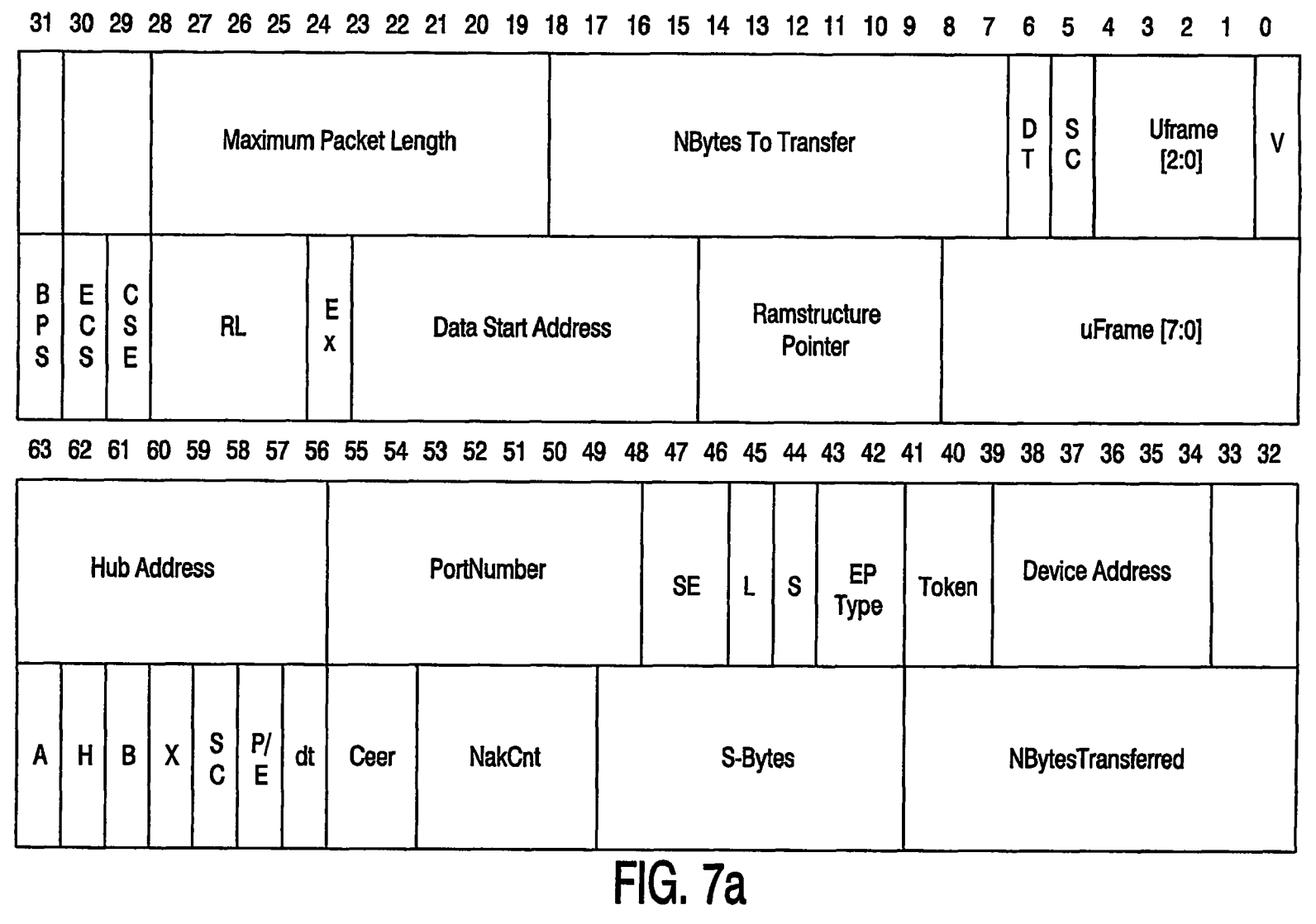

FIG. 7 illustrates the transfer-based protocol for supporting high-speed USB transmissions, with FIG. 7a showing the format of a 16-byte header of a transfer-based transfer descriptor for one endpoint, in accordance with the protocol, and FIGS. 7b and 7c describing the contents of the header fields. The transfer-based protocol header consists of parameters that have the same definition as the conventional USB EHCI software, allowing the transfer descriptors to be easily constructed.

The transfer-based protocol also ensures that data can be sent to each USB endpoint on a fair basis.

Figure 8:
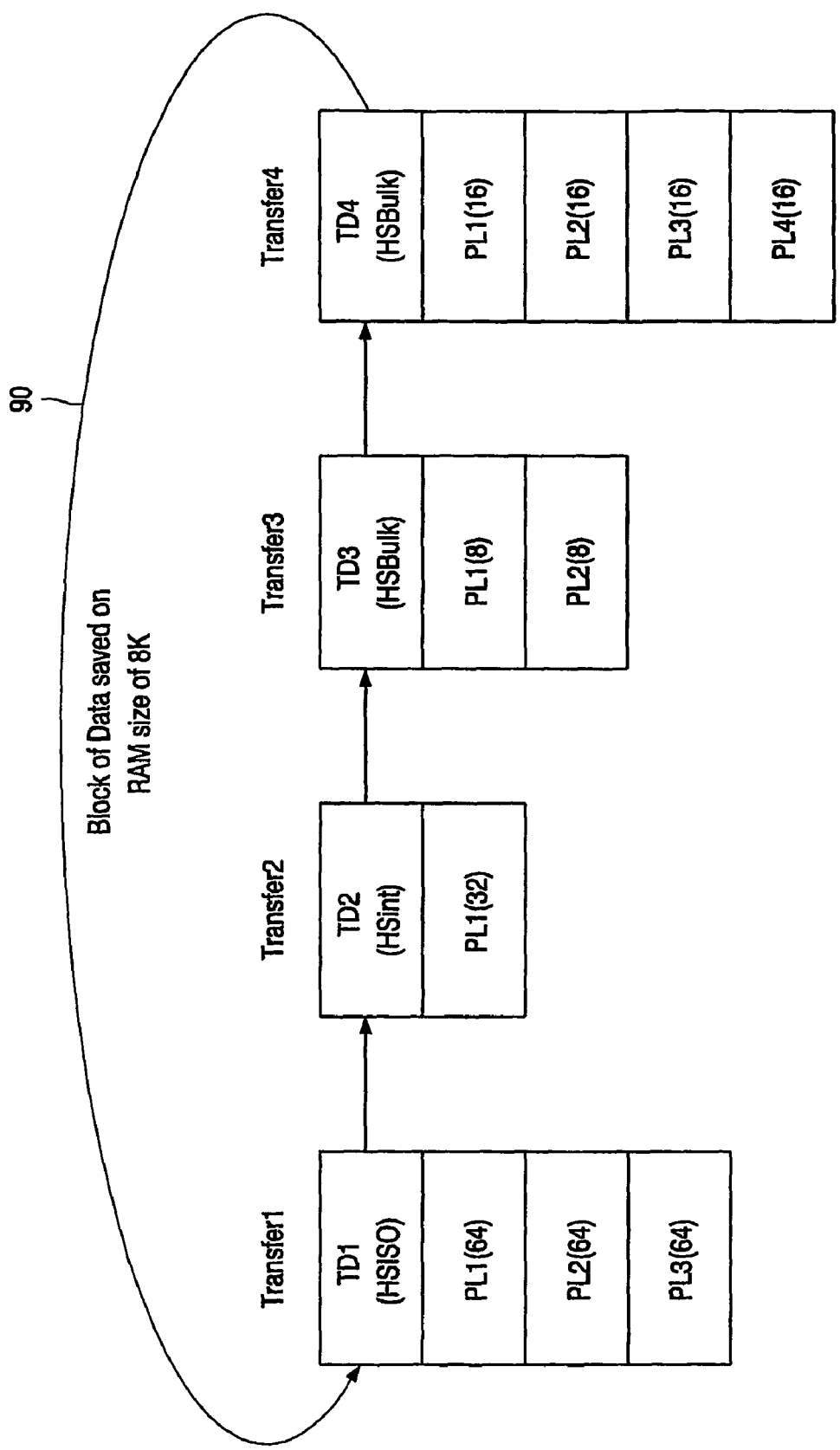
FIG. 8 is a schematic representation of data to be transmitted, stored in the memory of FIG. 4.

FIG. 8 shows a situation in which the payload data associated with a first transfer descriptor TD1 is divided into three packets, PL1, PL2 and PL3, each of 64 bytes; the payload data associated with a second transfer descriptor TD2 comprises just one packet PL1 of 32 bytes; the payload data associated with a third transfer descriptor TD3 is divided into two packets PL1 and PL2, each of 8 bytes; and the payload data associated with a fourth transfer descriptor TD4 is divided into four packets PL1, PL2, PL3 and PL4, each of 16 bytes.

Figure 9:
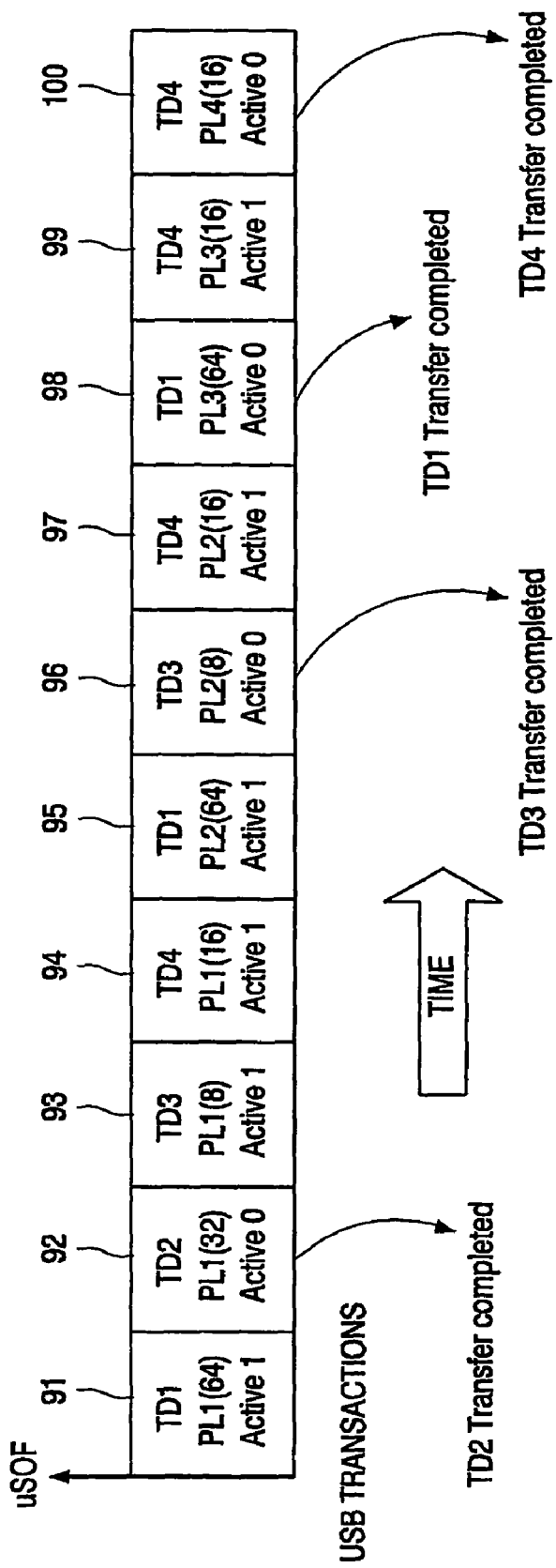
FIG. 9 illustrates a method by which the data of FIG. 8 may be transmitted.

FIG. 9 illustrates the method by which these packets of data are transferred out of the RAM 50, or 56, to their respective endpoints in respective devices connected to the host.

As indicated by the arrow 90 in FIG. 8, a cyclical process occurs. Firstly, in step 91, the first packet PL1 associated with the first transfer descriptor TD1 is transferred. The transfer descriptor contains an Active flag which is set high, to indicate that there remains more data associated with this transfer descriptor.

Secondly, in step 92, the first packet PL1 associated with the second transfer descriptor TD2 is transferred. This transfer descriptor now contains an Active flag which is set low by the host controller 40, indicating that this completes the transfer of the payload data associated with the second transfer descriptor TD2.

Next, in steps 93 and 94, the first packets PL1 of payload data associated with the third and fourth transfer descriptors TD3 and TD4 respectively, are transferred. Again, each of these transfer descriptors contain an Active flag which is set high, indicating that there is more of the payload data associated with each of the transfer descriptors, remaining to be transferred.

Next, in step 95, the second packet PL2 of payload data associated with the first transfer descriptor TD1 is transferred. The Active flag remains high, because there is still more of the payload data associated with that transfer descriptor, remaining to be transferred.

The transfer of the payload data associated with the second transfer descriptor TD2 has been completed, and so, in step 96, the second packet PL2 of payload data associated with the third transfer descriptor TD3 is transferred. This time, the Active flag in this transfer descriptor is set low, indicating that this completes the transfer of the payload data associated with the third transfer descriptor TD3.

In step 97, the second packet PL2 of payload data associated with the fourth transfer descriptor TD4 is transferred, and the Active flag remains high.

In step 98, the third packet PL3 of payload data associated with the first transfer descriptor TD1 is transferred, and the Active flag is set low, indicating that this completes the transfer of payload data associated with the first transfer descriptor.

In steps 99 and 100, the third and fourth packets PL3 and PL4 of payload data associated with the fourth transfer descriptor TD4 are transmitted, with the Active flag being set low in step 100, to indicate that this completes the transfer of the payload data associated with the fourth transfer descriptor TD4.

During execution of the transfer-based transfer descriptors, the content of the transfer-based transfer descriptors is updated by the host controller logic unit 52. For example, the Active flag within a transfer descriptor header is set low when the transfer of the payload data associated with the transfer descriptor is completed. The USB EHCI interface software 84 then reformats the updated transfer-based transfer descriptors into a format which can be handled by the conventional EHCI host stack 82, and the updated transfer-based transfer descriptors are copied back to the system memory 30.

There is therefore provided a host controller which allows the incorporation of high speed USB host functionality, in particular into non-PC based systems.

The invention claimed is:

1. A host controller for use in a bus communication device having a host microprocessor and a system memory, the host controller comprising:
   a first interface for direct connection to a memory bus which connects the host microprocessor and the system memory, such that the host controller is adapted to act only as a slave on the memory bus;
   an internal memory configured into at least two distinct sections to store a plurality of transfer-based transfer descriptors including a first section configured to store a plurality of transfer-based transfer descriptor headers, and a second section configured to store a plurality of transfer-based transfer descriptor payloads, the respective transfer-based transfer descriptors received through the first interface, said internal memory having a plurality of transfer-based transfer descriptor header and transfer-based transfer descriptor payload locations mapped in the host microprocessor, said first section of the internal memory is sub-divided into two sub-parts, and is adapted to consecutively store transfer descriptor headers relating to periodic transfers in a first subpart, and to consecutively store transfer descriptor headers relating to asynchronous transfers in a second sub-part; and
   a second interface, for connection to an external bus, wherein the host controller is adapted to:
      execute stored transfer-based transfer descriptors;
      update the content of the stored transfer-based transfer descriptors on execution; and
      copy the updated stored transfer-based transfer descriptors to the system memory.

2. A host controller as claimed in claim 1, wherein the internal memory is a dual-port RAM.

3. A host controller as claimed in claim 1, wherein the internal memory is a single-port RAM, and the host controller further comprises an arbiter to allow data to be written to and read from the RAM essentially simultaneously.

4. A host controller as claimed in claim 1, wherein the host controller is adapted to scan the first sub-part of the internal memory once in each micro-frame, and is adapted to scan the second sub-part continuously throughout each micro-frame.

5. A host controller as claimed in claim 1, wherein the host controller is a USB host controller and the second interface is a USB bus interface.

6. A host controller as claimed in claim 1, wherein the internal memory is adapted to store multiple micro-frames of transfer descriptors, and to execute the stored transfer descriptors without intervention from the host microprocessor.

7. A host controller as claimed in claim 6, wherein each of the multiple micro-frames of transfer descriptors may store payload data relating to one or more of isochronous, interrupt and bulk data transfers.

8. A host controller as claimed in claim 1, wherein the first interface comprises:
   a memory mapped input/output;
   a memory management unit; and
   a slave direct memory access (DMA) controller.

9. A host controller as claimed in claim 1, wherein the first interface comprises registers.

10. A host controller as claimed in claim 9, further comprising a logic unit, wherein the logic unit comprises the second interface.

11. A host controller as claimed in claim 10, further comprising an internal bus coupled between the registers and the logic unit, wherein the internal bus is configured to carry control signals from the registers to the logic unit.

12. A host controller as claimed in claim 1, further comprising an external connection to the first interface, wherein the external connection is configured to carry control and interrupt signals.

13. The host controller as claimed in claim 1 wherein the host controller is further configured to respond to memory transactions scheduled by the host microprocessor.

14. A bus communication device, comprising:
   a host microprocessor;
   a system memory;
   a memory bus, which connects the host microprocessor and the system memory; and
   a host controller, wherein the host microprocessor is adapted to form transfer-based transfer descriptors, and write the transfer-based transfer descriptors to the system memory and to the host controller, and wherein the host controller comprises:
      a first interface for direct connection to the memory bus, such that the host controller is adapted to act only as a slave on the memory bus;
      an internal memory, for storing a plurality of transfer-based transfer descriptors, the internal memory having a first section adapted to consecutively store transfer descriptor headers and a second section adapted to consecutively store transfer descriptor payloads, the first section sub-divided into a first subpart adapted to consecutively store transfer descriptor headers relating to periodic transfers and a second subpart adapted to consecutively store transfer descriptor headers relating to asynchronous transfers, the transfer descriptors received through the first interface, said internal memory having a plurality of header and payload transfer descriptor locations mapped in the host microprocessor; and
      a second interface, for connection to an external bus, wherein the host controller is adapted to:
         execute stored transfer-based transfer descriptors;
         update the content of the stored transfer-based transfer descriptors on execution; and
         copy the updated stored transfer-based transfer descriptors to the system memory.

15. A bus communication device as in claim 14, wherein the second interface for the host controller is a USB bus interface, and the bus communication device is adapted to act as a USB host.

16. A bus communication device as claimed in claim 14, wherein the host microprocessor is adapted to write a plurality of micro-frames of transfer descriptors to the system memory and to the host controller, and the host controller is adapted to execute the plurality of micro-frames of transfer descriptors without intervention from the host microprocessor.

17. A bus communication device as claimed in claim 14, wherein the host controller further comprises:
a memory mapped input/output;
a memory management unit;
a slave direct memory access (DMA) controller; and
registers.

18. A bus communication device as claimed in claim 17, wherein the host controller further comprises:
a logic unit, wherein the logic unit comprises the second interface; and
an internal bus coupled between the registers and the logic unit, wherein the internal bus configured to carry control signals from the registers to the logic unit.

19. A bus communication device as claimed in claim 14, wherein the host controller further comprises an external connection to the first interface, wherein the external connection is configured to carry control and interrupt signals.

20. The bus communication device as claimed in claim 14, wherein the plurality of locations of the internal memory mapped to the system memory are configured for access by the host microprocessor when the host microprocessor addresses the mapped addresses of the system memory.

21. A method of executing bus transactions with a host controller comprising:
configuring the host controller as a slave on a memory bus, the memory bus directly connected to the host controller, a host microprocessor, and a system memory;
configuring a block of dedicated transfer descriptor header space of an internal memory to be mappable in the host microprocessor, said address space accessible via the memory bus;
configuring a block of dedicated transfer descriptor payload address space of an internal memory to be mappable in the host microprocessor,
wherein said address space accessible via the memory bus, wherein the block of dedicated transfer descriptor header address space is separate from the block of dedicated transfer descriptor payload address space, and wherein the block of dedicated transfer descriptor header address space is sub-divided into a first subpart adapted to consecutively store transfer descriptor headers relating to periodic transfers and a second subpart adapted to consecutively store transfer descriptor headers relating to asynchronous transfers;
reading transfer-based transfer descriptors from the internal memory;
executing the transfer-based transfer descriptors; and
updating the content of the transfer-based transfer descriptors on execution.

\* \* \* \* \*